(12) United States Patent
Kaminsky

(10) Patent No.: US 9,309,749 B2
(45) Date of Patent: Apr. 12, 2016

(54) SYSTEM AND METHOD FOR PRODUCING COAL BED METHANE

(75) Inventor: Robert D. Kaminsky, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 1000 days.

(21) Appl. No.: 13/320,192

(22) PCT Filed: May 13, 2010

(86) PCT No.: PCT/US2010/034746
§ 371 (c)(1),
(2), (4) Date: Nov. 11, 2011

(87) PCT Pub. No.: WO2011/002556
PCT Pub. Date: Jan. 6, 2011

(65) Prior Publication Data
US 2012/0085079 A1 Apr. 12, 2012

Related U.S. Application Data

(60) Provisional application No. 61/222,347, filed on Jul. 1, 2009.

(51) Int. Cl.
*B01J 7/00* (2006.01)
*E21B 43/00* (2006.01)

(52) U.S. Cl.
CPC ............... *E21B 43/006* (2013.01); *Y02E 20/14* (2013.01)

(58) Field of Classification Search
CPC ... E21B 43/006; E21B 43/164; E21B 43/168; E21B 43/40; E21B 41/0064
See application file for complete search history.

(56) References Cited

U.S. PATENT DOCUMENTS

| | | | |
|---|---|---|---|
| 3,759,679 A | 9/1973 | Franz et al. | |
| 4,043,395 A | 8/1977 | Every et al. | |
| 5,014,785 A | 5/1991 | Puri et al. | |
| 5,085,274 A | 2/1992 | Puri et al. | |

(Continued)

OTHER PUBLICATIONS

Reeves, S.R. (2001) "Geological Sequestration of CO2 in Deep, Unmineable Coalbeds: An Integrated Research and Commercial-Scale Field Demonstration Project," *SPE 71749*, Society of Petroleum Engineers.

(Continued)

*Primary Examiner* — Imran Akram
(74) *Attorney, Agent, or Firm* — ExxonMobil Upstream Research-Law Department

(57) ABSTRACT

Exemplary embodiments of the present technology provide systems and methods for producing power from coalbed methane (CBM) with decreased $CO_2$ emissions. For example, a method of producing power according to an exemplary embodiment includes converting a feedstock from a hydrocarbon source into a gas mixture comprising $CO_2$ and $H_2$. The gas mixture is injected into a coalbed to cause CBM to desorb from the coal and $CO_2$ to adsorb onto the coal. The hydrocarbon source is separate from the coalbed, i.e., does not exchange hydrocarbons with the hydrocarbon source. A gas mixture is produced from the coalbed, wherein the produced gas mixture includes $H_2$ and $CH_4$. The gas mixture may be combusted to generate power, while releasing lower amounts of $CO_2$ than would be released from the combustion of pure $CH_4$.

9 Claims, 3 Drawing Sheets

(56) References Cited

U.S. PATENT DOCUMENTS

| | | |
|---|---|---|
| 5,147,111 A | 9/1992 | Montgomery |
| 5,332,036 A | 7/1994 | Shirley et al. |
| 5,388,640 A | 2/1995 | Puri et al. |
| 5,402,847 A | 4/1995 | Wilson et al. |
| 5,566,756 A | 10/1996 | Chaback et al. |
| 5,769,165 A | 6/1998 | Bross et al. |
| 6,016,868 A | 1/2000 | Gregoli et al. |
| 6,412,559 B1 | 7/2002 | Gunter et al. |
| 6,820,689 B2 | 11/2004 | Sarada |
| 7,491,250 B2 | 2/2009 | Hershkowitz et al. |
| 2005/0201929 A1 | 9/2005 | Hershkowitz et al. |
| 2006/0219403 A1 | 10/2006 | Steinberg |
| 2007/0144747 A1 | 6/2007 | Steinberg |
| 2008/0021251 A1 | 1/2008 | Iaccino et al. |
| 2009/0014170 A1 | 1/2009 | Zubrin et al. |

OTHER PUBLICATIONS

Reeves, S.R. et al. (2004) "A Technical and Economic Sensitivity Study of Enhanced Coalbed Methane Recovery and Carbon Sequestration in Coal" *U.S. Department of Energy*, Topical Report DE-FC26-00NT40924.

van Hemert, P., et al. (2006), "Adsorption of carbon dioxide and a hydrogen-carbon dioxide mixture", 2006 International Coalbed Methane Symposium (Tuscaloosa, Alabama, May 22-26), Paper 0615.

Zhu, J., et al., (2002) "Recovery of Coalbed Methane by Gas Injection," *SPE 75255* Society of Petroleum Engineers.

SYSTEM AND METHOD FOR PRODUCING COAL BED METHANE

CROSS-REFERENCE TO RELATED APPLICATION

This application is the National Stage of International Application No. PCT/US2010/034746, filed 13 May 2010, which claims the benefit of U.S. Provisional Patent Application 61/222,347 filed 1 Jul. 2009 entitled SYSTEM AND METHOD FOR PRODUCING COAL BED METHANE, the entirety of which is incorporated by reference herein.

FIELD

Exemplary embodiments of the present technology relate to a system and method to produce coal bed methane (CBM) and sequester $CO_2$.

BACKGROUND

This section is intended to introduce various aspects of the art, which may be associated with exemplary embodiments of the present technology. This discussion is believed to assist in providing a framework to facilitate a better understanding of particular aspects of the present technology. Accordingly, it should be understood that this section should be read in this light, and not necessarily as admissions of prior art.

Coat deposits may hold significant amounts of hydrocarbon gases, such as methane, ethane, and propane, generally adsorbed onto the surface of the coal. A significant amount of natural gas reserves exist as adsorbed species within coalbeds. The natural gas from coalbeds, commonly referred to as "coalbed methane" (CBM), currently constitutes a major source of the natural gas production in the United States. The CBM is generally produced by depressurization of coal seams.

However, even using well stimulation methods, such as cavitation (see, for example, U.S. Pat. No. 5,147,111), only a small fraction of the CBM is economically recoverable. More specifically, depressurization is limited to higher permeability coalbeds. This is because as pressure is decreased, coal cleats (i.e., natural fractures) may collapse and decrease the permeability of the coalbed. Loss of permeability is particularly a concern for deep coalbeds, which may have a low initial permeability. Depressurization may also result in production of low-pressure gas needing significant power for compression to permit pipelining to market.

As an alternative to, or in conjunction with, depressurization, improved recovery of CBM may be obtained by injecting another gas into the coalbed. For example, $CO_2$ may be used to enhance the production of CBM (see, for example, U.S. Pat. Nos. 4,043,395; 5,085,274; and 5,332,036). $CO_2$ more strongly adsorbs to the coal than CBM and, thus, may displace adsorbed CBM. In other applications, nitrogen ($N_2$), which less strongly adsorbs onto coal than CBM, may be used (see, for example, U.S. Pat. Nos. 5,014,785; 5,566,756; Scott R. Reeves, "Geological Sequestration of CO2 in Deep, Unmineable Coalbeds: An Integrated Research and Commercial-Scale. Field Demonstration Project," SPE 71749 (Society of Petroleum Engineers, 2001); and Jichun. Zhu, et al., "Recovery of Coalbed Methane by Gas injection," SPE 75255 (Society of Petroleum Engineers, 2002). $N_2$, and other less strongly adsorbing gases, lower the partial pressure of the CBM components in the bulk gas phase, which causes the CBM to desorb from the coal. Both of these methods can maintain the coalbed at relatively high pressures and hence aid permeability by keeping the cleat system open.

Other gases have also been described as enhancing production of coalbed methane or modifying coalbeds for other purpose's. For example, U.S. Patent Publication No. 2007/0144747 describes a process for pretreating an underground coal bed to enhance the potential for carbon dioxide sequestration. The method involves injecting hydrogen into an underground coal bed, wherein the hydrogen is at a temperature below about 800° C.; extracting hydrogen and methane from the coalbed; separating the hydrogen and methane; delivering the methane as a product of the process; and injecting the separated hydrogen into the deposit to continue the process. When the sequestration of carbon dioxide is desired, hydrogen may be optionally produced from methane and carbon dioxide may optionally be injected for sequestration.

The methods above are generally limited by the availability of the gas in sufficient amounts for injection. Further, the cost of separation to isolate gases from either the produced gases or the atmosphere (for example, by a swing adsorption process) may be prohibitively expensive. After separation, the gases may need substantial compression (e.g., 2500 psia or more depending on subsurface depth) for injection into a formation. Thus, technology for improved recovery of coalbed methane would be valuable.

Other related material may be found in at least U.S. Patent Publication No. 2005/0201929, U.S. Pat. Nos. 5,402,847; 6,412,559; and 7,491,250, and P. van Hemert, et al., "Adsorption of carbon dioxide and a hydrogen-carbon dioxide mixture," 2006 International Coalbed Methane Symposium (Tuscaloosa, Ala., May 22-26, 2006), Paper 0615.

SUMMARY

An exemplary embodiment of the present technology provides a system for generating a gas suitable for producing power from a coalbed. The system uses a hydrocarbon source that is separate from the coalbed, for example, to provide a carbonaceous feedstock that is not obtained from the coalbed. The system may have reduced $CO_2$ emissions as compared to straight combustion of hydrocarbons from the hydrocarbon source. The system may include a chemical convertor configured to convert a feedstock from the hydrocarbon source into a gas mixture comprising $CO_2$ and $H_2$. The system may include an injection well configured to inject the gas mixture into a coalbed, which is distinct from the hydrocarbon source, and a production well configured to harvest a production gas from the coalbed, wherein the production gas comprises $H_2$ and $CH_4$.

The hydrocarbon source may include a natural gas reservoir, an oil reservoir, a first coalbed, a waste processing facility, or any combinations thereof. The chemical convertor may include units configured to perform a reforming process, for example, an auto-thermal reformer, a steam reformer, a partial oxidation unit, a cracking unit, or any combinations thereof. The power produced may include steam, electricity, or a combination thereof.

The feedstock may include a natural gas, coal, a carbonaceous waste material, an oil, or any combinations thereof. The production gas may comprise greater than about 25 mole % $H_2$ and greater than about 25 mole % $CH_4$. A treatment system may be included in the system to treat the production gas to remove carbon monoxide (CO), water, particulates, heavy-end hydrocarbons, or any combinations thereof. A compressor may be used to increase the pressure of the production gas. A pipeline may be used to convey the production gas to a power plant.

Another exemplary embodiment of the present technology provides a method of producing power with low $CO_2$ emissions by converting a portion of the carbon content of the hydrocarbon gas to $CO_2$ and sequestering it prior to the combustion of the gas. The method includes converting a feedstock from a hydrocarbon source into a gas mixture comprising $CO_2$ and $H_2$. The gas mixture may be injected into a coalbed to cause CBM to desorb from the coal and $CO_2$ to adsorb onto the coal, thus sequestering at least a portion of the $CO_2$. The hydrocarbon source is generally not coupled to the coalbed, i.e., separated in space and not exchanging hydrocarbon content. A produced gas mixture may be collected from the coalbed, wherein the produced gas mixture comprises $H_2$ and $CH_4$.

At least a portion of the produced gas mixture may be combusted to produce power. The feedstock may be converted into the gas mixture by processing the feedstock in an auto-thermal reforming process, a steam reforming process, or a pressure swing reforming process. The feedstock may be converted into the gas mixture by partially oxidizing the feedstock to form a partially oxidized gas mixture. The partially oxidized gas mixture may be processed in a reformer to form the gas mixture. Converting the feedstock into the gas mixture may include cracking the feedstock to form lower molecular weight hydrocarbons. The lower molecular weight hydrocarbons may then be processed to form the gas mixture.

The produced gas may be processed to convert CO to $CO_2$ to form a chemically converted product gas. At least a portion of the chemically converted product gas may then be injected into a second coalbed to enhance CBM production from the second coalbed. In some embodiments the converted product gas may be separated into two or more streams of differing compositions by means of adsorbents, adsorbents, or membranes.

Another exemplary embodiment of the present technology includes a system for generating power from a coal bed. The system includes a hydrocarbon source and a chemical convertor configured to convert a feedstock from the hydrocarbon source into a gas mixture comprising $CO_2$ and $H_2$. The system may include an injection well configured to inject at least a portion of the gas mixture into a coalbed, wherein the hydrocarbon source is separate from the coalbed. The system may also include a production well configured to harvest a production gas from the coalbed, wherein the production gas comprises $H_2$ and $CH_4$. A power plant may be configured to combust at least a portion of the production gas to generate power. The power plant may include a burner, a boiler, a steam turbine, a gas turbine, an exhaust heat recovery unit, an electrical generator, or any combinations thereof.

DESCRIPTION OF THE DRAWINGS

The advantages of the present technology are better understood by referring to the following detailed description and the attached drawings, in which.

DETAILED DESCRIPTION

Figure 1:
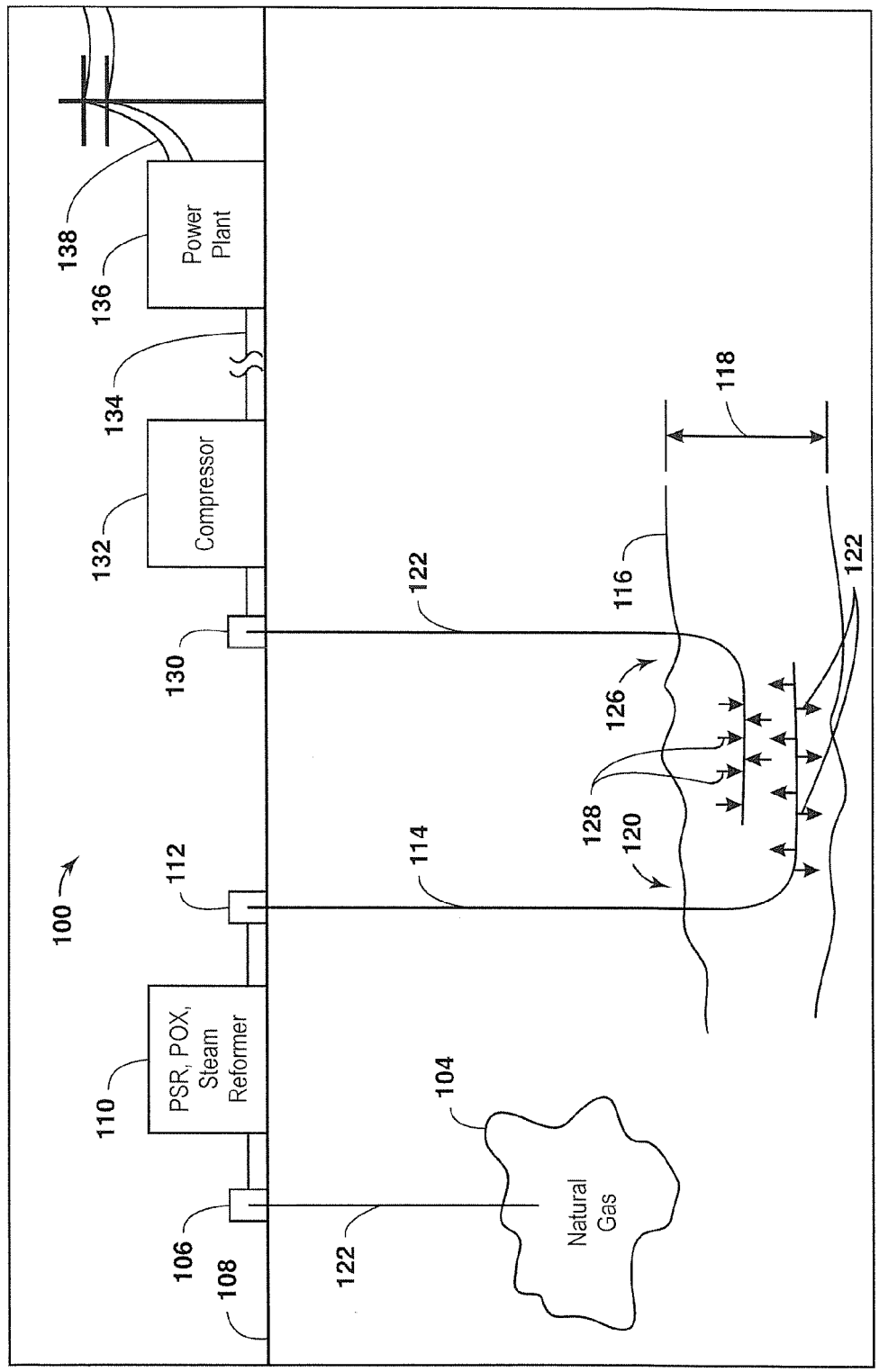
FIG. 1 is a diagram showing a system for producing CBM, in accordance with an exemplary embodiment of the present technology.

In the following detailed description section, the specific embodiments of the present technology are described in connection with preferred embodiments. However, to the extent that the following description is specific to a particular embodiment or a particular use of the present technology, this is intended to be for exemplary purposes only and simply provides a description of the exemplary embodiments. Accordingly, the technology is not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present technology is not limited by the usage of the terms shown below, as all equivalents, synonyms, new developments, and terms or techniques that serve the same or a similar purpose are considered to be within the scope of the present claims.

An "adsorbent material" is any material or combination of materials capable of adsorbing gaseous components. For example, an adsorbent material discussed herein is a natural coal bed, as discussed further below.

"Adsorption" refers to a process whereby certain components of a mixture adhere to the surface of solid bodies that it contacts. This process is generally reversible.

"Auto-thermal process" is used herein to describe a process including a plurality of chemical reactions, at least one of which is exothermic and at least one of which is endothermic, wherein some or all of the energy requirements of the endothermic reaction or reactions are supplied by the exothermic reaction or reactions. Thus, once the chemical reactions of the process had been initiated, minimal additional energy input is required to sustain the reactions, and the process is essentially thermally self-sustaining. In a first or production step of the process, the endothermic heat required for the catalytic reaction of the one or more hydrocarbons with water is provided by the exothermic heat of partial oxidation of the one or more hydrocarbons and by the usually exothermic chemical reaction of carbon dioxide with complex metal oxide. In a second or regeneration step of the process, the regeneration of the metal complex oxide is effected by reaction of oxygen with the spent complex metal oxide and the desorption of carbon dioxide taken up by the complex metal oxide from the first step, and this regeneration step also is an auto-thermal process.

"Boundaries" refer to locations of changes in the properties of subsurface rocks, which typically occur between geologic formations. This is relevant, for example, to the thickness of formations, as discussed below.

A "carbonaceous feedstock" and "feedstock", as used interchangeably herein, are defined to refer to carbonaceous material that can be used in a gasification system. Examples of suitable feedstock include, but are not limited to, fossil fuel based feedstocks, such as bitumen, coal, oil shale, kerogen, coke (including petroleum coke or "petcoke" and kerogen coke) and heavy oils, as well as other carbonaceous feedstocks, such as biomass, hazardous and non-hazardous waste materials, including municipal solid waste (MSW); wastes produced by industrial activity; biomedical wastes; carbonaceous material inappropriate for recycling, including non-recyclable plastics; sewage sludge; heavy refinery residuals; refinery wastes; hydrocarbon contaminated solids; agricultural wastes; and any mixture thereof. The feedstock may be provided as a mixture of two or more of the above feedstocks in various relative proportions.

A "catalyst" is a material which under certain conditions of temperature or pressure increases the rate of specific chemical reactions. A catalyst may also be a material that performs as a physisorbent or chemisorbent for specific components of the feed stream.

"Cavitation completion" or "cavitation" is a process by which an opening may be made in a formation. Generally, cavitation is performed by drilling a well into a formation. The formation is then pressurized in the vicinity of the well. The pressure is suddenly released, causing the material in the vicinity of the well to fragment. The fragments and debris may then be swept to the surface through the well by circulating a fluid through the well.

As used herein, a "chemical convertor" is used to generate hydrogen and carbon oxides (CO and $CO_2$) from hydrocarbon feed streams. The chemical convertor may use "reforming" and "reforming processes" to perform this function. For example, the chemical convertor may use steam reforming, pressure swing reforming, and auto-thermal reforming. The chemical convertor may also include processes for generating mixtures of $H_2$ and CO, such as the partial oxidation process described below.

"Coal" is generally a solid hydrocarbon, including, but not limited to, lignite, sub-bituminous, bituminous, anthracite, peat, and the like. The coal may be of any grade or rank. This can include, but is not limited to, low grade, high sulfur coal that is not suitable for use in coal-fired power generators due to the production of emissions having high sulfur content.

"Coalbed methane" or CBM is natural gas that is adsorbed onto the surface of coal. CBM may be substantially comprised of methane, but may also include ethane, propane, and other hydrocarbons. Further, CBM may include some amount of other gases, such as carbon dioxide ($CO_2$) and nitrogen ($N_2$).

A "compressor" is a machine that increases the pressure of a gas by the application of work (compression). Accordingly, a low pressure gas (e.g., 5 psig) may be compressed into a high-pressure gas (e.g., 1000 psig) for transmission through a pipeline, injection into a well, or other processes.

"Cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$ among other molecules.

A "dehydration device" is a device for removing water, in gaseous or liquid form, from a gas mixture. "Dewatered" describes broadly any reduction of water content. Typically, a dewatered hydrocarbon-containing material can have a majority of the water content substantially removed, e.g., less than about 5% by volume water or less than about 1% depending on the particular material and starting water content. Water contents much less than 1% may be desirable for certain gas streams.

"Directional drilling" is the intentional deviation of the wellbore from the path it would naturally take. In other words, directional drilling is the steering of the drill string so that it travels in a desired direction. Directional drilling can be used for increasing the drainage of a particular well, for example, by forming deviated branch bores from a primary borehole. Directional drilling is also useful in the marine environment where a single offshore production platform can reach several hydrocarbon reservoirs by utilizing a plurality of deviated wells that can extend in any direction from the drilling platform. Directional drilling also enables horizontal drilling through a reservoir. Horizontal drilling enables a longer section of the wellbore to traverse the payzone of a reservoir, thereby permitting increases in the production rate from the well. This may be useful in recovering coalbed methane (CBM), as coal may often be located in a narrow seam.

"Enriched" as applied to any stream withdrawn from a process means that the withdrawn stream contains a concentration of a particular component that is higher than the concentration of that component in the feed stream to the process.

A "facility" is a representation of a tangible piece of physical equipment through which hydrocarbon fluids are either produced from a reservoir or injected into a reservoir. In its broadest sense, the term facility is applied to any equipment that may be present along the flow path between a reservoir and its delivery outlets, which are the locations at which hydrocarbon fluids either enter the reservoir (injected fluids) or leave the reservoir (produced fluids). Facilities may comprise production wells, injection wells, well tubulars, wellhead equipment, gathering lines, manifolds, pumps, compressors, separators, surface flow lines and delivery outlets. As used herein, a facility may also include a chemical process unit, such as a steam reformer or a partial oxidation unit. In some instances, the term "surface facility" is used to distinguish those facilities other than wells. A "facility network" is the complete collection of facilities that are present in the model, which would include all wells and the surface facilities between the wellheads and the delivery outlets.

"Lithostatic pressure" (sometimes referred to as "lithostatic stress") is a pressure in a formation equal to a weight per unit area of an overlying rock mass (the "overburden"). The pressure in the formation is generally around 1 psi for every foot of depth. Thus, a formation that is at 100 for of depth may have a fluid pressure of 100 psig. This concept is also related to hydraulic fracturing, as a formation that is at a particular fluid pressure will generally not fracture until that pressure is exceeded. For example, a formation at a depth of 3000 ft below the surface may require a pressure of greater than about 3000 psig to fracture.

A "formation" is any finite subsurface region. The formation may contain one or more hydrocarbon-containing layers, one or more non-hydrocarbon containing layers, an overburden, or an underburden of any subsurface geologic formation. An "overburden" or an "underburden" is geological material above or below the formation of interest. An overburden or underburden may include one or more different types of substantially impermeable materials. For example, overburden or underburden may include rock, shale, mudstone, or wet/tight carbonate (i.e., an impermeable carbonate without hydrocarbons). An overburden or an underburden may include a hydrocarbon-containing layer that is relatively impermeable. In some cases, the overburden or underburden may be permeable.

A "fracture" is a crack or surface of breakage within rock not related to foliation or cleavage in metamorphic rock along which there has been no movement. A fracture along which there has been displacement is a fault. When walls of a fracture have moved only normal to each other, the fracture is called a joint. Fractures may enhance permeability of rocks greatly by connecting pores together, and for that reason, fractures are induced mechanically in some reservoirs in order to boost hydrocarbon flow.

"Geological layers" or "layers" refers to layers of the subsurface (e.g., the Earth's subsurface) that are disposed between geologic formation tops. A geological layer may include a hydrocarbon reservoir or may represent subsurface layers over or under hydrocarbon reservoir.

A "horizontal well bore" is used herein to mean the portion of a well bore in an subterranean zone to be completed which is substantially horizontal or at an angle from horizontal in the range of from about 0° to about 15°. A "deviated well bore" is one at an angle from vertical in the range of from about 15° to about 75°.

"Hydraulic fracturing" is used to create fractures that extend from the well bore into formations. A fracturing fluid, typically viscous, is generally injected into the formation with sufficient pressure (for example, at a pressure greater than the lithostatic pressure of the formation) to create and extend a fracture, and a proppant is used to "prop" or hold open the created fracture after the hydraulic pressure used to generate the fracture has been released. The fractures may be useful for enhancing the production from a reservoir or, as described herein, opening fractures for placement of a conductive proppant. Hydraulic fractures may be substantially horizontal in orientation, substantially vertical in orientation, or oriented along any other plane. Generally, the fractures tend to be vertical at greater depths, due to the increased pressure of the overburden.

"Hydrocarbons" are generally defined as molecules formed primarily by carbon and hydrogen atoms. Hydrocarbons may also include other elements such as, but not limited to, halogens, metallic elements, nitrogen, oxygen, or sulfur. Hydrocarbons may be, but are not limited to coal, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media.

"Hydrocarbon production" or "production" refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example chemicals or hydraulic fracturing the well bore to promote increased flow, well servicing, well logging, and other well and wellbore treatments.

"Natural gas" refers to raw or treated natural gas. Raw natural gas is primarily comprised of methane (>50%), but may also include numerous other light hydrocarbons (0-30%) including ethane, propane, and butanes. Heavier hydrocarbons, including pentanes, hexanes and impurities like benzene may also be present in small amounts (<10%). Furthermore, raw natural gas may contain small amounts of non-hydrocarbon impurities, such as nitrogen (0-10%), hydrogen sulfide (0-5%), carbon dioxide (0-30%), and traces of helium, carbonyl sulfide, various mercaptans, and water. Treated natural gas is primarily comprised of methane, but may also contain small percentages of heavier hydrocarbons, such as ethane, propane, butanes and pentanes, as well as small percentages of nitrogen and carbon dioxide.

"Partial oxidation" (POX) is a technique by which a less than stoichiometric amount of oxygen is added to a hydrocarbon to generate hydrogen and carbon monoxide. Generally, for an alkane, partial oxidation would follow the formula:

$$C_nH_{(2n+2)} + \tfrac{1}{2}nO_2 \rightarrow (n+1)H_2 + nCO$$

For methane, this results in the reaction:

$$CH_4 + \tfrac{1}{2}O_2 \rightarrow 2H_2 + CO$$

A second reaction stage may use the water-gas shift reaction to convert at least part of the carbon monoxide to carbon dioxide, according to the following formula:

$$CO(g) + H_2O(g) \rightarrow CO_2(g) + H_2(g)$$

"Perforated" means that the member or liner has holes or openings through it. The holes can have any shape, e.g., round, rectangular, slotted or the like. The term is not intended to limit the manner in which the holes are made, i.e., it does not require that they be made by perforating, or the arrangement of the holes. A perforated well may be used to collect hydrocarbons from a reservoir.

"Permeability" is the capacity of a rock to transmit fluids through the interconnected pore spaces of the rock. Permeability may be measured using Darcy's Law: $Q=(k \Delta P A)/(\mu L)$, where $Q$=flow rate (cm$^3$/s), $\Delta P$=pressure drop (atm) across a cylinder having a length L (cm) and a cross-sectional area A (cm$^2$), $\mu$=fluid viscosity (cp), and k=permeability (Darcy). The customary unit of measurement for permeability is the millidarcy. The term "relatively permeable" is defined, with respect to formations or portions thereof, as an average permeability of 10 millidarcy or more (for example, 10 or 100 millidarcy). The term "relatively low permeability" is defined, with respect to formations or portions thereof, as an average permeability of less than about 10 millidarcy. An impermeable layer generally has a permeability of less than about 0.1 millidarcy.

"Porosity" is defined as the ratio of the volume of pore space to the total bulk volume of the material expressed in percent. Permeability is the capacity of the rock to transmit fluids through the interconnected pore spaces of a rock; the customary unit of measurement is the millidarcy. Although there often is an apparent close relationship between porosity and permeability, because a highly porous rock may be highly permeable, there is no real relationship between the two; a rock with a high percentage of porosity may be very impermeable because of a lack of communication between the individual pores or because of capillary size of the pore space.

"Pressure" and "total pressure" are interchangeable and have the usual meaning wherein the pressure in an enclosed volume is the force exerted per unit area by the gas on the walls of the volume. Pressure is usually shown as pounds per square inch (psi). "Atmospheric pressure" refers to the local pressure of the air. Local atmospheric pressure is assumed to be 14.7 psia, the standard atmospheric pressure at sea level. "Absolute pressure" (psia) refers to the sum of the atmospheric pressure plus the gage pressure (psig). "Gage pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Pressure swing reforming" (PSR) is a two-step cyclic process to reactively remove oxygen from an air stream, while simultaneously producing high pressure synthesis gas stream that includes $CO_2$ and $H_2$. In PSR the steam reforming bed is operated as a reverse flow reactor, in which heat addition (by combustion) alternates with heat consumption (by reforming), with the flow being reversed between these steps. In PSR, the entire catalyst bed is used to store and exchange heat with the reactants, substantially increasing the efficiency of the process.

"Produced fluids" and "production fluids" refer to liquids or gases removed from a subsurface formation, including, for example, an organic-rich rock formation. Produced fluids may include both hydrocarbon fluids and non-hydrocarbon fluids. Production fluids may include, but are not limited to, $H_2$, partially oxidized hydrocarbons, CBM, synthesis gas, a pyrolysis product of coal, carbon dioxide, hydrogen sulfide and water (including steam). Produced fluids may include both hydrocarbon fluids and non-hydrocarbon fluids.

"Reservoir formations" or "reservoirs" are typically pay zones include sandstone, limestone, chalk, coal and some types of shale. Pay zones can vary in thickness from less than one foot (0.3048 m) to hundreds of feet (hundreds of m). The permeability of the reservoir formation provides the potential for production. "Conventional reservoirs" are natural gas reservoirs that may contain natural gas (and oil) over a pool of water, wherein the water and hydrocarbons are generally trapped by down dips, e.g., rock formations that trend downward away from the reservoir. The permeability of conventional reservoirs may allow production of gas without further enhancement of the formation. In contrast, "tight reservoirs" are trapped pockets of natural gas, or other hydrocarbons, that are in rock having a low permeability. Tight reservoirs may need enhancement, such as by fracturing, to allow for the production of natural gas.

"Reformer feed gas" is a mixture of molecular species suitable for introducing into a reformer to generate hydrogen. A reformer feed gas may include methane (or other hydrocarbons) and steam.

"Reforming" or "steam reforming" is a process by which hydrocarbon feedstocks may be converted to hydrogen ($H_2$) and carbon oxides (CO and $CO_2$). It is currently the most common technique for the commercial generation of $H_2$. As an example, at a temperature of about 700-1100° C., and in the presence of a metal catalyst (often nickel), steam will react with methane to form a synthesis gas according to the following formula:

$$CH_4(g) + H_2O(g) \rightarrow CO(g) + 3H_2(g)$$

A second reaction stage may use the water-gas shift reaction to convert at least part of the carbon monoxide in the synthesis gas to carbon dioxide, according to the following formula:

$$CO(g) + H_2O(g) \rightarrow CO_2(g) + H_2(g)$$

The water-gas shift reaction itself may be performed in one or more stages using various catalysts and temperatures (generally below 350° C.). Accordingly, the overall chemical reaction for reforming of methane is represented by the chemical formula:

$$CH_4(g) + 2H_2O(g) \rightarrow CO_2(g) + 4H_2(g)$$

"Sequestration" refers to the storing of a gas or fluid that is a by-product of a process rather than discharging the fluid to the atmosphere or open environment. For example, as described herein, carbon dioxide gas formed from the burning or steam reforming of hydrocarbons may be sequestered in underground formations, such as coalbeds.

"Sour gas" generally refers to natural gas containing acid gases such as hydrogen sulfide ($H_2S$) and carbon dioxide ($CO_2$). When the $H_2S$ and $CO_2$ have been removed from the natural gas feedstream, the gas is classified as "sweet." Generally, a gas is classified as sour when greater than about 4 ppm by volume of an acid gas is present, although in some contexts, gas up to 50 ppm by volume may be considered to be sweet. The term "sour gas" is applied to natural gases that include $H_2S$, because of the odor that is emitted even at low concentrations from an unsweetened gas. $H_2S$ is corrosive to most metals normally associated with gas pipelines so that processing and handling of sour gas may lead to premature failure of such systems.

"Steam" refers to water vapor or a combination of liquid water and water vapor. If the steam is superheated, it may contain minimal amounts of liquid water and may be termed dry steam. Steam that is in direct contact with liquid water, such as condensate, is termed saturated steam. It will be understood by those skilled in the art that steam may additionally contain trace elements, gases other than water vapor or other impurities.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

"Swing adsorption processes" includes various processes for concentration of gases such as pressure swing adsorption (PSA), thermal swing adsorption (TSA), and partial pressure swing or displacement purge adsorption (PPSA), including combinations of these processes. All of these processes share a common basis in the differential adsorption of materials onto a substrate, followed by the release of the adsorbed material to form a more concentrated mixture of the released material. The swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA). The term swing adsorption also includes these rapid cycle processes.

"Thermal reformer" or "reformer" refers to any one of a number of known devices for reforming natural gas, or other hydrocarbons, in the presence of oxygen into synthesis gas comprising carbon monoxide and hydrogen. Examples of thermal reformers include steam reformers, partial oxidation reformers, auto-thermal reformers, and pressure swing reformers.

"Thickness" of a layer refers to the distance between the upper and lower boundaries of a cross section of a layer, wherein the distance is measured normal to the average tilt of the cross section.

"Utilities" means (unless otherwise specified) anything consumed in a facility or process unit including any fluid (gas or liquid) required in order to operate the overall compressor or gas processing equipment of the facility or process unit. Some common examples of utilities can include electrical power, fuel gas, seal gas, instrument and control gas, nitrogen or inert gas, blanket gas, hydraulic fluids, pneumatic systems, water (including non-potable water), diesel or gasoline to run turbines or boilers or any other fluid or energy input required to run the equipment for a given process (for example, mechanical energy used to run a compressor).

"Well" or "wellbore" refers to a hole in the subsurface made by drilling or insertion of a conduit into the subsurface. The terms are interchangeable when referring to an opening in the formation. A well may have a substantially circular cross section, or other cross-sectional shapes (e.g., circles, ovals, squares, rectangles, triangles, slits, or other regular or irregular shapes). Wells may be cased, cased and cemented, or open-hole well, and may be any type, including, but not limited to a producing well, an experimental well, an exploratory well, or the like. A well may be vertical, horizontal, or any angle between vertical and horizontal (a deviated well), for example a vertical well may comprise a non-vertical component.

"Wellhead" consists of the pieces of equipment mounted at the opening of the well to regulate and monitor the extraction of hydrocarbons from the underground formation. It also prevents leaking of oil or natural gas out of the well, and prevents blowouts due to high pressure formations. Formations that are under high pressure typically require wellheads that can withstand a great deal of upward pressure from the escaping gases and liquids. These wellheads may often be designed to withstand pressures of up to 20,000 psi (pounds per square inch). The wellhead consists of three components: the casing head, the tubing head, and the 'Christmas tree'. The casing head consists of heavy fittings that provide a seal between the casing and the surface. The casing head also serves to support the entire length of casing that is run all the way down the well. This piece of equipment typically contains a gripping mechanism that ensures a tight seal between the head and the casing itself.

Exemplary embodiments of the present technology provide methods and systems for enhancing coal bed methane (CBM) production while sequestering $CO_2$ in a manner that may reduce the use of gas separation and compression systems. Generally, a hydrocarbon feedstock may be used to create a gaseous mixture containing $CO_2$ and $H_2$ (which may also have other entrained gases, such as COS, $H_2S$, and CO, among others). The gaseous mixture may be compressed, if needed, and then injected into a coalbed to desorb $CH_4$ from the coal. The $CO_2$ and other gasses having adsorption characteristics, such as $H_2S$ and $SO_2$, may be adsorbed in the coal matrix, while the desorbed $CH_4$ is returned to the surface as a mixture with the $H_2$ and any CO, if present. The $H_2$ (and any CO) reduce the partial pressure of methane to enhance CBM production. Further, a high injection pressure and the presence of non-adsorbing species (such as the $H_2$ & CO) may prevent cleat collapse or even expand the cleat system and, thus, improve permeability of the coalbed. The produced gas can then be used as a fuel for generating electricity at the site or sent to a more remote power plant, for example, by a pipeline. The present approach may also reduce the cost of using a feedstock that has a high sulfur content and aid in the production of deep CBM.

FIG. 1 is a diagram showing a system 100 for producing CBM, in accordance with an exemplary embodiment of the present technology. As illustrated in FIG. 1, a well 102 may be used to access a hydrocarbon source, shown as a natural gas reservoir 104 in this illustration. However, the hydrocarbon source is not limited to a natural gas reservoir. For example, the hydrocarbon source may be a first coalbed, an oil reservoir with a natural gas cap, or any number of other hydrocarbon sources or feedstocks, as discussed herein.

The natural gas is produced from the well 102 through a wellhead 106 located at the surface 108. In an exemplary embodiment, after production, the natural gas can be sent through various facilities at the surface to treat the gas, for example, to remove particulates, water, sulfur compounds, or natural gas liquids. In other embodiments, the natural gas can be used without further treatment. The natural gas can be used as a feedstock for a chemical convertor, such as PSR, POX, or steam reformer 110, to generate a gaseous mixture that includes $H_2$ and $CO_2$. Other chemical convertors that may be used in exemplary embodiments of the present technology include auto-thermal reformers, pressure swing reformers, partial oxidation reformers, and the like. After treatment and reforming, the gaseous mixture can be injected through another wellhead 112 into a second well 114. Compression may be utilized, for example, if the gas is injected into a deep formation.

The second well 114 may convey the gaseous mixture from the surface 108 to a coalbed 116. As the coalbed 116 may be a narrow geological layer, for example, having a thickness 118 of only a few meters to a few tens of meters, the second well 114 may have a section 120 that is directionally drilled through the coalbed 116, for example, a horizontal section 120 if the coalbed 116 is relatively horizontal. The horizontal section 120 may be perforated to allow the gaseous mixture to enter the coalbed 116, as indicated by arrows 122.

A third well 124, for example, a production well, may be drilled into the coalbed 116 to harvest the CBM produced from the coal. As for the second well 114, the third well 124 may have a horizontal section 126 to follow a narrow coalbed 116. The present technology are not limited to horizontal wells, as other embodiments may have different well geometries to follow coal seams at different angles, or may have vertical wells if a coalbed is large. The wells 114 and 124 may be displaced laterally by tens or hundreds of meters.

As for the second well 114, the horizontal section 126 of the third well 124 may be perforated to collect the CBM released from the coal and low adsorbing species, such as hydrogen, from the gaseous mixture injected through the second well 114. The collection of gases by the third well 124 is indicated by arrows 128. The production gas collected is transported to the surface through the third well 124, and through a third wellhead 130. The produced gas may be treated to reduce water content (such as by a dehydration device), remove particulates, remove heavy-end hydrocarbons, or other contaminants, such as CO. After treatment, analysis units (such as automatic gas chromatography analyzers) may be used to test the composition of the produced gas. The results may be used to control the injection rate of the gaseous mixture through the first well 114, for example, to balance the concentration of $H_2$ and CBM in the produced gas or to lower the amount of $CO_2$ in the produced gas.

In the exemplary embodiment illustrated in FIG. 1, the third wellhead 130 can be coupled to a compressor 132 to increase the pressure of the collected gas, prior to transporting the gas through a pipeline 134 to a power plant 136. At the power plant 136, the gas may be burned to heat boilers and generate steam, to fuel gas turbines, or in a combined cycle system. The gas used to generate power may include, for example, at least about 10 mol % $CH_4$ and at least about 10 mol % $H_2$, excluding water (i.e., on a dry basis) or at least about 25 mol % $CH_4$ and at least about 25 mol % $H_2$. Steam generated in boilers by the combustion of the produced gas may be used in turbines to generate mechanical energy to power electric generators. In other exemplary embodiments, the produced gas, or a portion thereof, may foci a gas turbine to generate mechanical or electrical power. The energy in the exhaust heat from the gas turbine may also be recovered, for example, by using an exhaust heat recovery unit to generate steam for utilities and electrical power generation.

Using the produced gas as a fuel provides lower $CO_2$ generation per unit of combustion energy than the original produced gas, and hence reduced environmental impact. For example, combustion of pure $CH_4$ produces about 55 grams (g) of $CO_2$ per million joules (MJ) of heat energy on a lower heating value (LHV) basis. However, if the gas composition can be changed to 75 mol % $CH_4$/25 mol % $H_2$, the $CO_2$ generation is reduced to about 50 g $CO_2$/MJ. Moreover, for 50 mol % $CH_4$/50 mol % $H_2$, the $CO_2$ generation is reduced to about 42 g $CO_2$/MJ and for 25 mol % $CH_4$/75 mol % $H_2$, the $CO_2$ generation is reduced to about 29 g $CO_2$/MJ. The electrical power may then be converted to different voltages in transformers and sent through substations into electrical lines 138 for transportation to consumers. In another exemplary embodiment, a power plant (such as a boiler system or a gas turbine) may be directly coupled to the third wellhead 130 to combust the collected CBM/$H_2$ mixture and generate power.

Figure 2:
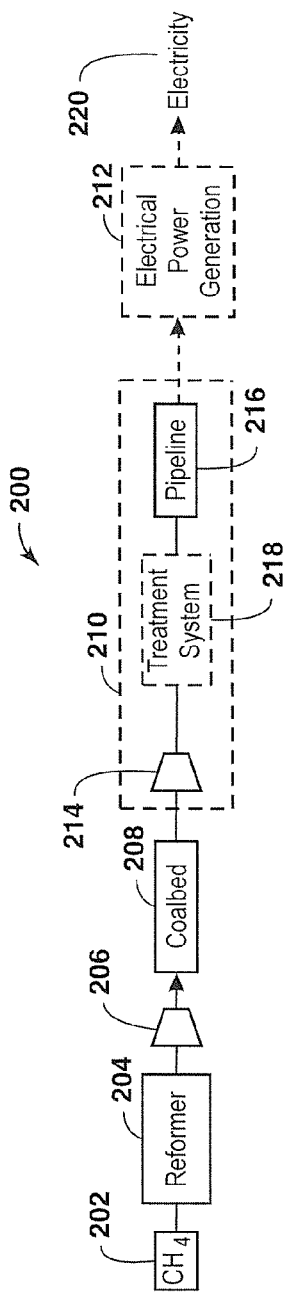
FIG. 2 is a process flow overview of a system for producing CBM, in accordance with an exemplary embodiment of the present, technology.

FIG. 2 is a process flow overview of a system 200 for producing CBM, in accordance with an exemplary embodiment of the present technology. Natural gas 202 from a source other than the coalbed, itself is used for generating the gas mixture for injection. In exemplary embodiments, natural gas 202 sources may include conventional gas reservoirs, associated gas from an oil reservoir, tight gas reservoirs, or a second coalbed. The use of a natural gas or hydrocarbon feed source that is distinct from the coalbed removes the need for costly gas separation and compression to permit recycling of components of the produced gas (such as $H_2$) back into the coalbed.

The natural gas 202 can be fed to a chemical convertor, such as steam reformer 204 (or other reformer systems, as discussed herein), to convert the methane (and other hydrocarbons) to a gas mixture that primarily includes $H_2$ and $CO_2$. The feed gas may be sweet (for example, low in $H_2S$ and $SO_2$) or may be treated prior to conversion to remove sulfur species. In standard $H_2$ generation, the $CO_2$ may be removed to form a pure $H_2$ stream, for example, by contacting the gas mixture with an amine. However, exemplary embodiments of the present technology take advantage of the $CO_2$ to assist in desorbing CBM and, thus, do not need $CO_2$ separation.

An example of a gas mixture that may result from steam reforming methane is 77 mol % $H_2$, 18 mol % $CO_2$, 0.3 mol % CO, and 4.7 mol % $CH_4$. However, the gas mixture is not limited to this composition, as conditions and feedstocks used will cause variations in the composition. A steam reforming reaction is usually performed at a pressure of about 300 psia. However, reaction pressures may be selected to balance later compression costs, reaction conversion efficiency, and reaction vessel cost. This may allow the gas mixture to be injected into the coalbed without further compression. Clean-up steps that may used in steam reforming, for example, to reduce CO content, are not generally needed in exemplary embodiments of the present technology.

After steam reforming, the gas mixture may be fed to a compressor 206 and then injected into a coalbed 208 to enhance CBM recovery. As previously discussed, the enhancement in CBM production is generally a result of two processes: adsorption of the $CO_2$, which may replace CBM on the coalbed; and reduction of the methane gas-phase partial pressure by dilution with low adsorbing species, such as $H_2$. As discussed with respect to FIG. 1, the produced gas, which includes $CH_4$ and $H_2$, may be used directly for fuel locally, for example, for local utilities. In other embodiments, the produced gas may be transported by a conveying system 210 to a remote electrical power plant 212 as fuel. If the power plant is distant, the conveying system 210 may include a compressor 214 to increase the gas pressure prior to feeding the gas through a pipeline 216. In exemplary embodiments, a treatment system 218 may be optionally included either before or after the compressor 214. The treatment system 218 may include facilities to remove particulates, reduce water content (such as a dehydration device), or to remove heavy-end hydrocarbons or other contaminants, such as CO. The treatment system 218 may also include analysis units (such as automatic gas chromatography analyzers) to test the composition of the produced gas.

The produced gas may then be combusted at the electrical power plant 212 to generate electricity 220. As discussed above, the combustion of the gas mixture will generally have reduced $CO_2$ emissions in comparison to pure natural gas since a significant portion of the fuel gas will be $H_2$.

Figure 3:
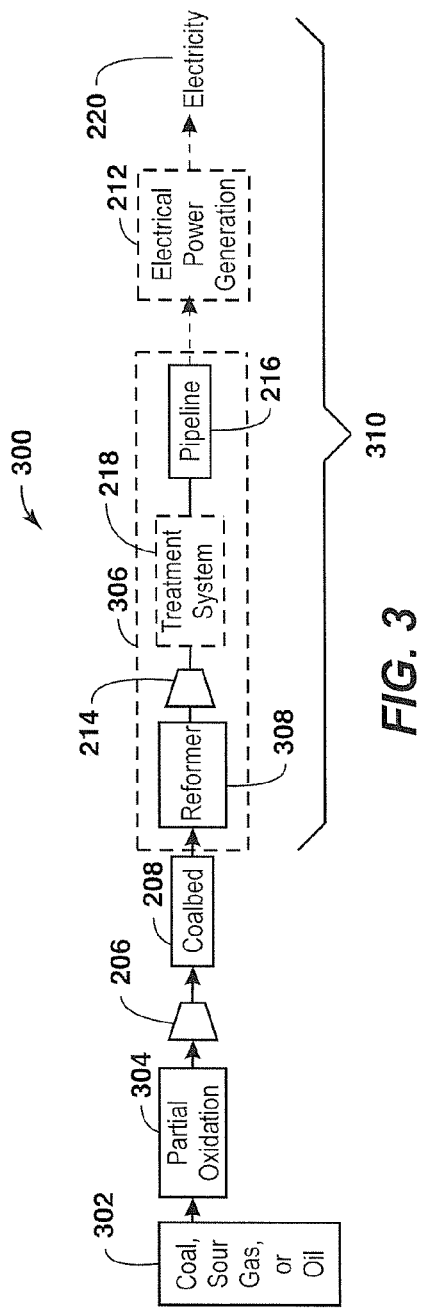
FIG. 3 is a process flow overview of a system for producing CBM, illustrating the use of another feedstock for a hydrocarbon source, in accordance with an exemplary embodiment of the present technology.

FIG. 3 is a process flow overview of a system 300 for producing CBM, illustrating the use of another feedstock for a hydrocarbon source, in accordance with an exemplary embodiment of the present technology. As shown in FIG. 3, coal, sour gas, or oil 302 may be used as the hydrocarbon feedstock. A partial oxidation (POX) unit 304, as discussed herein, may be used to convert the feedstock to $H_2$ and CO, with a lesser amount of $CO_2$ and other gases. As the POX process is generally exothermic, the heat generated by the POX unit 304 may be recovered, for example, to generate steam for electrical power generation or to provide heat to endothermic processes. Sulfur species that may be present in the feedstock are generally converted to $H_2S$, COS, and $SO_2$ in the POX unit 304. Rather than performing a desulfurization in a separate facility, followed by steam reforming to convert CO to $CO_2$ and $H_2$, the raw POX gas may be pressurized in a compressor 206 and injected into a coalbed 208 without further treatment, as discussed with respect to FIG. 2. The coalbed 208 will preferentially adsorb and sequester the $CO_2$ and sulfur species while releasing $CH_4$. As previously noted, the injected $H_2$ may aid methane desorption by reducing gas-phase partial pressures of the methane.

Adsorption affinity in coals may generally be correlated with an adsorbate species' normal boiling point. The normal boiling points of the species of interest are (in ascending order): $H_2$—20 K; CO—82 K; $N_2$—77 K; $CH_4$—112 K; $CO_2$—185 K; $H_2S$—212 K; and COS—223 K. The produced gas will generally include lower boiling point species and, thus, as $H_2$, CO, and $N_2$ are all significantly lower in boiling point than $CO_2$, the produced gas may include $H_2$, $CH_4$, CO, and $N_2$ (if present). $N_2$ will be present in the produced gas if air or enriched air is used as the oxidizing gas in the POX reactions. The adsorption of acidic species by the coalbed 208 will have sweetened the produced gas.

As discussed above, the produced gas may be used to fuel a local power plant or may be fed through a conveying system 306 to a remote electrical power plant 212 as fuel. A steam reformer 308 may be included in the conveying system 306 to reduce the amount of CO in the transported gas. As described with respect to FIG. 2, a compressor 214 may be used to increase the pressure of the gas, prior to feeding the gas through a pipeline 216. Further, a treatment system 218 may be optionally included before the steam reformer 308, the compressor 214, or the pipeline 216, in another exemplary embodiment, the gas obtained from the steam reformer 308 may be injected into another coalbed (not shown) to generate extra methane while further sequestering carbon. The produced gas may then be used in a power generating station 212 to produce steam, mechanical energy, or electricity 220, as discussed with respect to FIG. 2.

Figure 4:
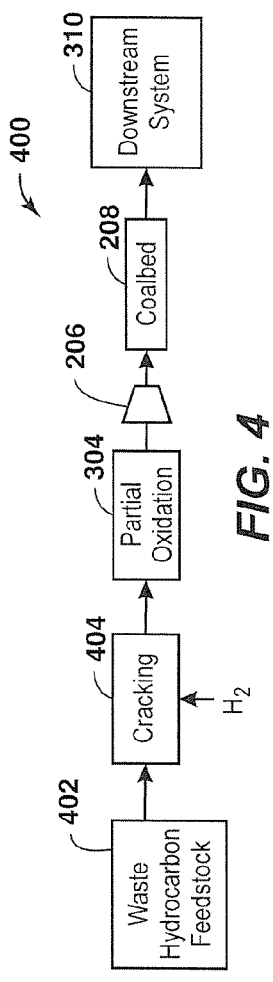
FIG. 4 is a process flow overview of a system for producing CBM, illustrating the use of another feedstock for a hydrocarbon source, in accordance with an exemplary embodiment of the present technology.

The downstream systems 310, including gas treatment, transportation, and power generation may be used with other upstream systems, as discussed with respect to FIG. 4. Further, the feedstocks that may be used in exemplary embodiments of the present technology are not limited to a hydrocarbon feedstock originating from a reservoir. Any carbonaceous feedstock may be used to generate an $H_2/CO_2$ mixture for enhancing the production of CBM.

FIG. 4 is a process flow overview 400 of a system for producing CBM, illustrating the use of another feedstock for a hydrocarbon source, in accordance with an exemplary embodiment of the present technology. As shown in FIG. 4, a waste hydrocarbon stream 402, for example, from a waste processing facility, may be used as a feedstock to generate the $H_2/CO_2$ mixture used to enhance the production of CBM. The waste stream may include, for example, plastics, tires, plant wastes, or any number of other materials, as disclosed herein. The process 400 may include a cracking unit 404 to lower the molecular weight of the waste feedstocks, which may be useful for high molecular weight materials such as tires or plastics. In other embodiments, the cracking unit 404 may not be needed as a partial oxidation unit 304 may be sufficient. As described with respect to FIG. 3, the POX unit 304 generates a gas mixture that may include $H_2$, CO, and lesser amounts of $CO_2$ and other gases. The gas mixture may also contain other compounds, such as $H_2S$, COS, and $SO_2$, that may be generated by the POX unit 304 from sulfur species present in the feedstock.

As previously described, the gas mixture may be pressurized in a compressor 206, prior to being injected into a coalbed 208. The $CBM/H_2$ mixture from the coalbed 208 may then be processed and used to generated power in a downstream system 310, as generally described with respect to FIG. 3. The process 400 illustrated in FIG. 4 provides for recycling of waste materials into electrical power while lowering the amount of $CO_2$ released into the atmosphere.

Figure 5:
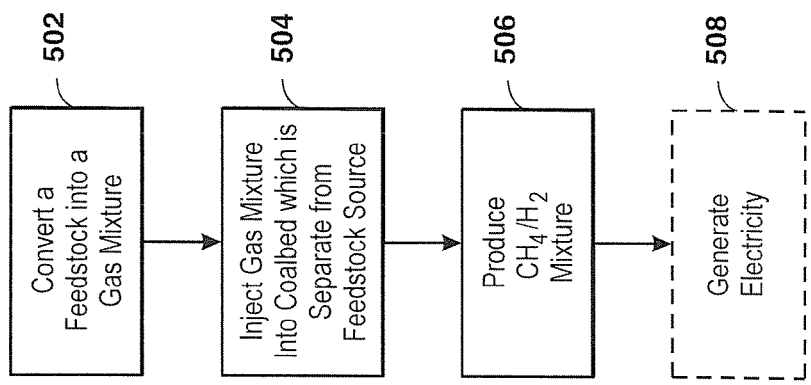
FIG. 5 is a process flow diagram showing a method for enhancing the production of CBM, in accordance with at least one exemplary embodiment of the present technology.

FIG. 5 is a process flow diagram showing a method 500 for enhancing the production of CBM, in accordance with at least one exemplary embodiment of the present technology. The method 500 begins at block 502 with the conversion of a hydrocarbon feedstock from a hydrocarbon source to a gas mixture that includes $H_2$ and $CO_2$. The hydrocarbon source for the feedstock may be separate from the coalbed, for example, not coupled to or part of the coalbed. Generally, the hydrocarbon used to create the gas mixture does not originate from the coalbed. At block 504, the gas mixture is injected into a coalbed to enhance the production of CBM. As discussed above, the infection of the gas mixture may force desorption of the CBM as $CO_2$ is preferentially adsorbed onto the coal and as the $H_2$ causes the partial pressure of the CBM to decrease. The resulting $CBM/H_2$ mixture is produced from the coalbed at block 506. At block 508, the $CBM/H_2$ mixture may optionally be used to produce electricity. As discussed previously, the generation of electrical power may be performed in the field, for example, in local utilities, or may be remote from the field, for example, where the produced gas is compressed and sent by pipeline to a power plant.

While the present technology may be susceptible to various modifications and alternative forms, the exemplary embodiments discussed above have been shown only by way of example. However, it should again be understood that the technology is not intended to be limited to the particular embodiments disclosed herein. Indeed, the present technology include all alternatives, modifications, and equivalents falling within the true spirit and scope of the appended claims.

What is claimed is:

1. A system for generating a gas suitable for producing power from a coalbed, comprising:
   a hydrocarbon source;
   a chemical convertor in fluid communication with the hydrocarbon source configured to convert a feedstock from the hydrocarbon source into a gas mixture comprising $CO_2$ and $H_2$;
   an injection well in direct fluid communication with both the chemical converter and the coalbed configured to inject the gas mixture comprising $CO_2$ and $H_2$ into the coalbed;
   the coalbed configured to receive the gas mixture and adsorb and sequester a portion of the $CO_2$ in the coalbed, wherein the coalbed is separate from the hydrocarbon source;
   a production well configured to harvest a production gas from the coalbed, wherein the production gas comprises $H_2$ and $CH_4$ and wherein the production gas comprises greater than about 10 mole $H_2$ and greater than about 10 mole % $CH_4$, wherein the composition of the production gas is on a dry basis; and
   a pipeline directly connecting the production well to a combustion apparatus that powers an electrical generator, the pipeline configured to deliver the harvested production gas to the combustion apparatus, wherein the pipeline does not have a recycle means with the coalbed.

2. The system of claim 1, wherein the hydrocarbon source comprises a natural gas reservoir, a first coalbed, an oil reservoir, a waste processing facility, or any combinations thereof.

3. The system of claim 1, wherein the chemical convertor comprises an auto-thermal reformer, a steam reformer, a pressure swing reformer, or any combinations thereof.

4. The system of claim 1, wherein the chemical convertor comprises a partial oxidation unit.

5. The system of claim 1, further comprising a cracking unit configured to produce the feedstock.

6. The system of claim 1, wherein the feedstock comprises natural gas, coal, oil, a carbonaceous waste material, or any combinations thereof.

7. The system of claim 1, further comprising a treatment facility configured to treat the production gas to remove particulates, CO water, heavy-end hydrocarbons, or any combinations thereof.

8. The system of claim 1, further comprising a pipeline to convey the production gas to a power plant.

9. The system of claim 1, further comprising an electric power generation system configured to be fed by the production gas.

* * * * *